United States Patent
Hosie et al.

(10) Patent No.: US 10,432,707 B2
(45) Date of Patent: Oct. 1, 2019

(54) OPTIMIZATION OF INTEGRATION FLOWS IN CLOUD ENVIRONMENTS

(71) Applicant: International Business Machines Corporation, Armonk, NY (US)

(72) Inventors: John Hosie, Eastleigh (GB); Martin A. Ross, Gosport (GB); Craig H. Stirling, Hedge End (GB); Dominic J. Storey, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 15/058,511

(22) Filed: Mar. 2, 2016

(65) Prior Publication Data
US 2017/0257429 A1 Sep. 7, 2017

(51) Int. Cl.
*H04L 29/08* (2006.01)
*H04L 29/06* (2006.01)

(52) U.S. Cl.
CPC ........ *H04L 67/1008* (2013.01); *H04L 67/101* (2013.01); *H04L 63/20* (2013.01)

(58) Field of Classification Search
CPC ... G06F 17/5077; G06F 9/54; H04L 67/2852; H04L 63/04; H04L 67/1008; H04L 67/101; H04L 67/10; H04L 63/10; H04L 63/0428; H04L 63/20; H04L 67/2814
See application file for complete search history.

(56) References Cited

U.S. PATENT DOCUMENTS

| | | | |
|---|---|---|---|
| 7,496,667 B2 * | 2/2009 | Adam | G06F 9/505 709/223 |
| 8,630,177 B2 | 1/2014 | Vasseur et al. | |
| 9,063,789 B2 | 6/2015 | Beaty et al. | |
| 9,086,929 B2 | 7/2015 | Bailey et al. | |
| 2004/0117534 A1 * | 6/2004 | Parry | G06F 13/24 710/260 |

(Continued)

OTHER PUBLICATIONS

Chen et al., "An Ant Colony Optimization Approach to a Grid Workflow Scheduling Problem With Various QoS Requirements," IEEE Transactions on Systems, Man, and Cybernetics—Part C: Applications and Reviews, vol. 39, No. 1, Jan. 2009, pp. 29-43. DOI: 10.1109/TSMCC.2008.2001722.

(Continued)

*Primary Examiner* — S M A Rahman
*Assistant Examiner* — Ranjan Pant
(74) *Attorney, Agent, or Firm* — Grant M. McNeilly

(57) ABSTRACT

An integration flow is monitored to determine a processing location of a message. The integration flow includes a route, one or more nodes, and one or more secure connectors. A first message is received by the integration flow. A central processing unit serialization load is received including a serialization of the first message on a first secure connector and a deserialization of the first message on a second secure connector. A processing load of the first message running on a first node of the one or more nodes is received. A first threshold of a processing load of the first message is received. The first threshold is determined to have been reached. Based on the first threshold being reached, a processing location of the integration flow is altered such that the first message is processed on a second node of the one or more nodes.

16 Claims, 8 Drawing Sheets

(56) References Cited

U.S. PATENT DOCUMENTS

| | | | |
|---|---|---|---|
| 2004/0210909 A1* | 10/2004 | Dominguez, Jr. | H04L 29/06 719/316 |
| 2007/0204078 A1* | 8/2007 | Boccon-Gibod | G06F 21/10 710/54 |
| 2010/0042720 A1* | 2/2010 | Stienhans | G06F 9/5072 709/226 |
| 2011/0078303 A1 | 3/2011 | Li et al. | |
| 2011/0231552 A1* | 9/2011 | Carter | G06F 9/5072 709/226 |
| 2011/0282982 A1* | 11/2011 | Jain | G06F 9/5094 709/223 |
| 2012/0191802 A1* | 7/2012 | Rodrigues | H04L 67/06 709/217 |
| 2012/0203908 A1* | 8/2012 | Beaty | G06F 9/5072 709/226 |
| 2012/0284330 A1* | 11/2012 | Figueroa | H04L 12/1881 709/204 |
| 2013/0080623 A1* | 3/2013 | Thireault | G06F 9/5027 709/224 |
| 2013/0185413 A1* | 7/2013 | Beaty | G06F 9/5072 709/224 |
| 2013/0191539 A1* | 7/2013 | Sailer | H04L 67/34 709/225 |
| 2013/0263209 A1 | 10/2013 | Panuganty | |
| 2013/0268674 A1 | 10/2013 | Bailey et al. | |
| 2014/0047342 A1* | 2/2014 | Breternitz | G06F 9/5061 715/735 |
| 2014/0280488 A1* | 9/2014 | Voit | H04L 67/10 709/203 |
| 2014/0282614 A1* | 9/2014 | Warren | G06F 9/465 719/316 |
| 2015/0180949 A1 | 6/2015 | Maes et al. | |
| 2015/0234670 A1* | 8/2015 | Shimogawa | G06F 9/45533 718/1 |
| 2016/0057073 A1* | 2/2016 | Steinder | H04L 47/72 709/226 |
| 2016/0087854 A1* | 3/2016 | Jayanti Venkata | G06F 8/60 709/224 |
| 2016/0277250 A1* | 9/2016 | Maes | H04L 41/145 |

OTHER PUBLICATIONS

IBM, "Creating a secure connector," IBM API Management 2.0.0: IBM WebSphere Cast Iron Live Web API Services: Getting Started, IBM Knowledge Center, last updated: Feb. 10, 2014, 1 page. http://www-01.ibm.com/support/knowledgecenter/SSWHYP_2.0.0/com.ibm.apimgmt.webapi.doc/task_createconnector.html.

Li et al., "Applications integration in a hybrid cloud computing environment: modelling and platform," Enterprise Information Systems, 2013, vol. 7, No. 3, pp. 237-271, (Printed: 39 pages), Published online: Apr. 11, 2012. DOI: 10.1080/17517575.2012.677479.

Liu et al., "Ant Colony Optimization Based Service flow Scheduling with Various QoS Requirements in Cloud Computing," 2011 First ACIS International Symposium on Software and Network Engineering (SSNE), 2011, pp. 53-58. DOI: 10.1109/SSNE.2011.18.

Mell et al., "The NIST Definition of Cloud Computing: Recommendations of the National Institute of Standards and Technology," Special Publication 800-145, National Institute of Standards and Technology, Sep. 2011, 7 pages, Gaithersburg, MD.

Psaraftis et al., "Dynamic Shortest Paths in Acyclic Networks with Markovian Arc Costs," Operations Research, vol. 41, No. 1, Jan.-Feb. 1993, pp. 91-101.

Talukder et al., "Multiobjective differential evolution for scheduling workflow applications on global Grids," Concurrency and Computation: Practice and Experience, 2009, Published online in Wiley InterScience, 15 pages. DOI: 10.1002/cep.1417.

Thai et al., "Executing Bag of Distributed Tasks on Virtually Unlimited Cloud Resources," Proceedings of the 5th International Conference on Cloud Computing and Services Science (CLOSER), 2015, 8 pages.

Thai et al., "Executing Bag of Distributed Tasks on the Cloud: Investigating the Trade-offs Between Performance and Cost," 2014 IEEE 6th International Conference on Cloud Computing Technology and Science (CloudCom 2014), 8 pages.

Thai et al., "Optimal Deployment of Geographically Distributed Workflow Engines on the Cloud," 2014 IEEE 6th International Conference on Cloud Computing Technology and Science (CloudCom 2014), 6 pages.

Hosie et al., "Secure Deployment of an Application Across Deployment Locations," U.S. Appl. No. 14/953,353, filed Nov. 29, 2015.

* cited by examiner

OPTIMIZATION OF INTEGRATION FLOWS IN CLOUD ENVIRONMENTS

BACKGROUND

Aspects of the present disclosure relate to a message management environment, and more specifically, to modifying an integration flow within a hybrid cloud environment to alter the processing location of messages based on message priority and central processing unit (CPU) workload.

Hybrid cloud environments include a mix of on premise, private cloud, and third-party public cloud services. These platforms may be linked together allowing workloads to move between various on-premise system and public cloud services based on costs. The on-premise system and public cloud may be connected through application programming interfaces (APIs). Hybrid cloud environments generally allow for greater flexibility (e.g., using cloud bursting or other available strategies) with businesses that may have dynamic workload requirements.

SUMMARY

According to embodiments of the present disclosure, a computer implemented method is proposed to determine a processing location for a message to be processed on an integration flow of a hybrid cloud environment. The integration flow of the hybrid cloud environment merges an on-premise system and a public cloud to process messages as they flow though the integration flow.

One embodiment provides a method for determining a processing location for a message within an integration flow. An integration flow is monitored to determine a processing location of a message. The integration flow includes a route, one or more nodes, and one or more secure connectors. A first message is received by the integration flow. A central processing unit serialization load is received. The serialization load includes a serialization of the first message on a first secure connector of the one or more secure connectors and a deserialization of the first message on a second secure connector of the one or more secure connectors. A processing load of the first message running on a first node of the one or more nodes is received. A first threshold of a processing load of the first message is received. The first threshold is determined to have been reached. Based on the first threshold being reached, a processing location of the integration flow is altered such that the first message is processed on a second node of the one or more nodes.

Another embodiment is directed towards a system for determining a processing location for a message within an integration flow. The system includes a memory, a processor device communicatively coupled to the memory, and a hybrid cloud communicatively coupled to the memory and the processor device. The hybrid cloud is configured to monitor an integration flow to determine a processing location of a message. The integration flow includes a route, one or more nodes, and one or more secure connectors. The hybrid cloud is configured to receive a first message on the integration flow. The hybrid cloud is configured to receive a central processing unit serialization load. The serialization load includes a serialization of the first message on a first secure connector of the one or more secure connectors and a deserialization of the first message on a second secure connector of the one or more secure connectors. The hybrid cloud is configured to receive a processing load of the first message running on a first node of the one or more nodes. The hybrid cloud is configured to receive a first threshold of a processing load of the first message. The hybrid cloud is configured to determine that the first threshold has been reached. Based on the first threshold being reached, the hybrid cloud is configured to alter a processing location of the integration flow such that the first message is processed on a second node of the one or more nodes.

Yet another embodiment is directed towards a computer program product for determining a processing location for a message within an integration flow. The computer program product includes a computer readable storage medium having a computer readable application stored therein, and the computer readable application is executed on a computing device. The computer program product is configured to monitor an integration flow to determine a processing location of a message. The integration flow includes a route, one or more nodes, and one or more secure connectors. The computer program product is configured to receive a first message on the integration flow. The computer program product is configured to receive a central processing unit serialization load. The serialization load includes a serialization of the first message on a first secure connector of the one or more secure connectors and a deserialization of the first message on a second secure connector of the one or more secure connectors. The computer program product is configured to receive a processing load of the first message running on a first node of the one or more nodes. The computer program product is configured to receive a first threshold of a processing load of the first message. The computer program product is configured to determine that the first threshold has been reached. Based on the first threshold being reached, the computer program product is configured to alter a processing location of the integration flow such that the first message is processed on a second node of the one or more nodes.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
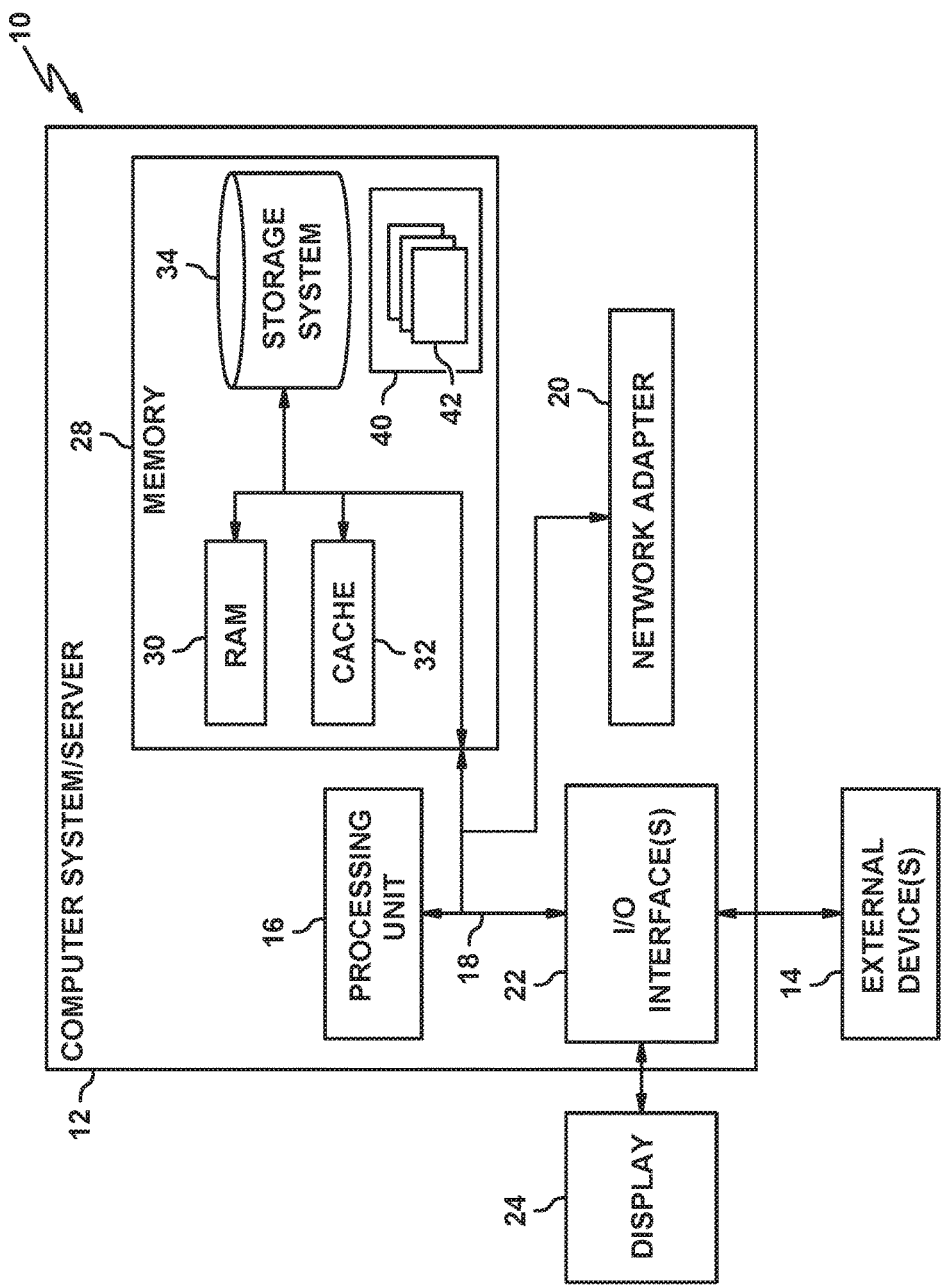
FIG. 1 depicts a cloud computing node, according to various embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to a message management environment, and more specifically, to modifying a processing location of an integration flow operating on a hybrid cloud environment. The hybrid cloud environment may provide one or more optional processing paths, which are provided within the hybrid cloud environment to increase a message processing efficiency. One or more route operators may determine the processing of messages on the on-premise system (on-premise) or the public cloud. While the present disclosure is not necessarily limited to such applications, various aspects of the disclosure can be appreciated through a discussion of various examples using this context.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Enterprise service bus (ESB) technologies may be implemented in cloud environments to provide communication capabilities between applications hosted on one site (i.e., a geographical location) and another site, regardless of the languages of the applications. Various implementations may help to enable connectivity and transformation in heterogeneous Information Technology (IT) environments for businesses of various sizes or industries, and may cover a range of platforms, including, e.g., cloud and mainframe systems. Utilizing and merging cloud technologies with on-premise (e.g., on-premises, on-location, private) systems may enable companies to scale elastically to cope with demand, reduce and rationalize IT infrastructure, reduce cost of operations, and deploy systems faster, easier, and on-demand. On-premise nodes may be nodes that are not stored or operating on the public cloud, on-premise nodes may be operate within one central location.

Certain end-to-end integrations (e.g., services) run within a hybrid cloud environment. Some of the message processing within the environment may be performed in a public cloud space and some of the message processing may be performed on-premise system (e.g., behind a company firewall). For example, messages containing secure data may only be processed when behind a company firewall, while other messages may be processed partly on-premise system and partly on the cloud. The end-to-end integrations may be altered to increase the efficiency of the service by altering the pathing of nodes within the hybrid cloud environment. By optimizing the pathing of the services, a user may see a decrease in CPU usage, in CPU runtime per message, and/or in latency. Altering the pathing of the services is described further herein.

Embodiments of a hybrid cloud environment may include an integration flow, which organizes a flow of various operations being performed on one or more nodes (e.g., subsets, operations). When messages are sent from a first node (e.g., operation) on-premise system to a second node on the public cloud, or from public cloud to on-premise, the message may pass across the hybrid cloud boundary. Before being transferred over the hybrid cloud boundary, the message may need to be serialized. The serialization (e.g., marshalling) of the message may include transforming the message from a first language (e.g., Extensible Markup Language (XML), JavaScript Object Notification (JSON), etc. used in the first location into a series of bits or bytes, which may be deserialized (e.g., unmarshalled) into a second language used in the second location. To limit excessive serialization costs and Input/Output (I/O) operations across the hybrid cloud boundary, modifications may be made to the integration flow.

As nodes of an application can be reused in other services, the number of times the message is transferred over the hybrid cloud boundary, between on-premise system and public cloud environments, may increase and make the whole service less efficient. To reduce inefficiency or to increase the efficiency of the service as a whole, the flow of data may be altered to reduce usage associated with CPU (e.g., data serialization) and network I/O. Performance and/or service efficiency may be increased as a result.

For linking applications within the hybrid cloud environments, an Application Programming Interface (API) service may be utilized. API services may use secure connectors to connect to systems that are behind a firewall. For systems such as databases, secure connectors may be used to run an integration of the hybrid cloud environment. The secure connectors may also be used to serialize/deserialize the messages as they are transferred over the hybrid cloud boundary. The API services may enable an integration running in a public cloud space to connect to an application running on-premise system behind a company firewall.

Certain integration flows may perform actions on messages containing sensitive data, which may have restrictions associated with where that data can flow. For example, certain messages or data within messages may need to stay behind a company firewall, or not be allowed to go out of the country. These message restrictions may be determined by a message priority. The message priority may determine if the message may be processed on-premise, on the cloud, or both on-premise system and on the cloud.

When an application is deployed to a hybrid cloud environment where nodes are deployed to either the on-premise system or public cloud environment, the full application may be deployed to the on-premise system environment, giving the on-premise system solution the ability to run the entire application. The on-premise system environment may also deploy un-restricted nodes (i.e., nodes that may run on both the on-premise system and public cloud environment) to the public cloud environment. The un-restricted nodes may be optionally processed operations, which may process on-premise system or on the public cloud environment. The optionally processed operations may include changing the processing location of an operation on-premise to an operation on the public cloud. The determination of the optionally processed operations will be described further herein.

A runtime analysis of the deployment environments of the applications may be performed as well as static analysis of the applications to determine if there are multiple transfers over the hybrid cloud boundary. The runtime analysis may also include determining if the on-premise systems have capacity to perform the computation locally (e.g., local computation, in the on-premise system). The capacity of the local computation may include factoring an offset of the cost associated with serializing/deserializing the messages when transferring the messages over the hybrid cloud boundary, as well as using the message properties and service level agreement (SLA) targets as inputs into the determination if there is only the on-premise system capacity to process a subset of messages.

In various embodiments, the hybrid cloud environment may include one or more data centers that are still on-premise system but communicating between each other over the network. A first data center may be termed as the on-premise system and a second data center may be termed as the public cloud. The communication within the one or more data center hybrid cloud environment may follow similar protocols as described herein as a hybrid cloud environment.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In a cloud computing node 10 there may be a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
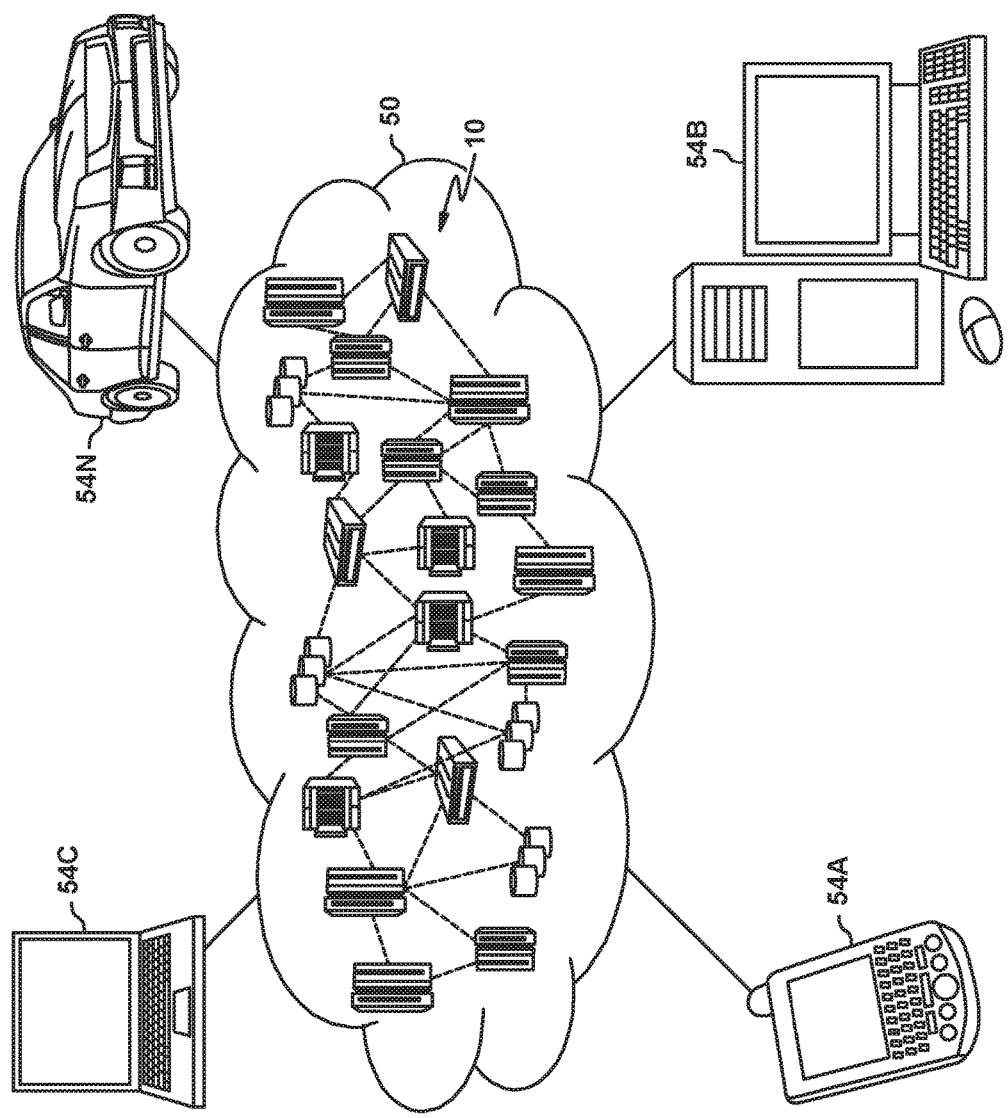
FIG. 2 depicts a cloud computing environment, according to various embodiments of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
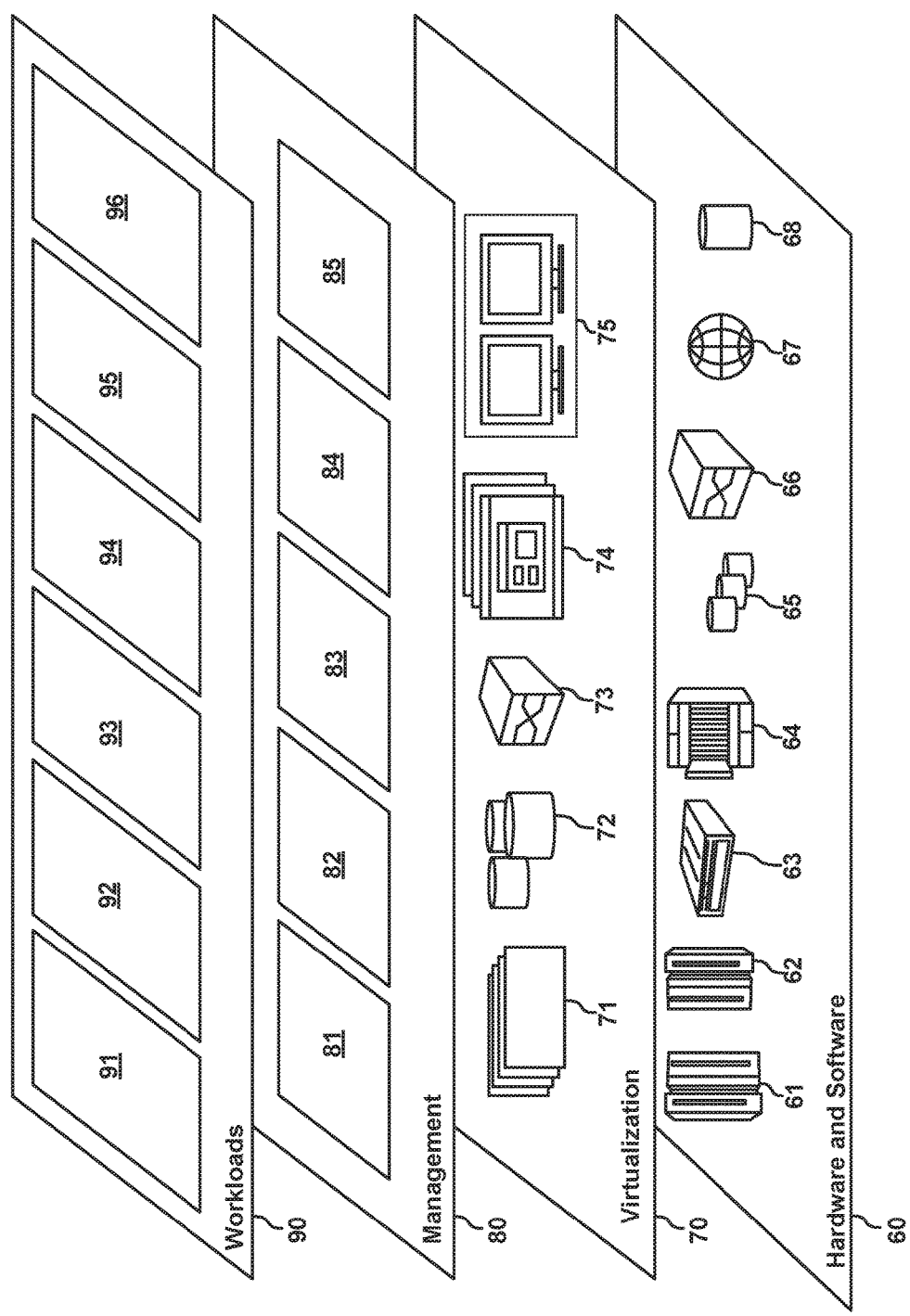
FIG. 3 depicts abstraction model layers, according to various embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hybrid cloud 96. The hybrid cloud 96 may include an on-premise system and public cloud environments; the hybrid cloud environment is described further herein.

Figure 4:
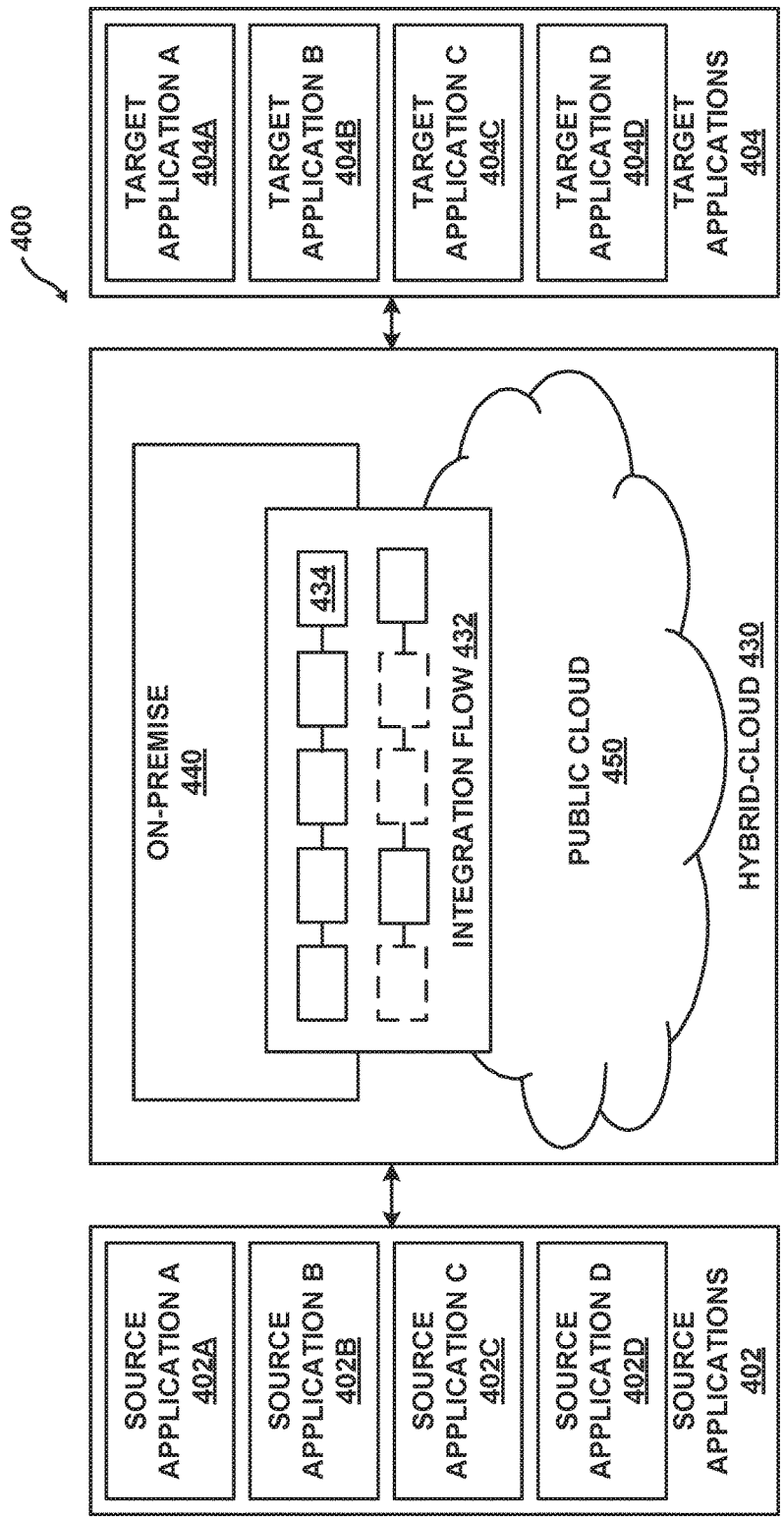
FIG. 4 depicts a hybrid cloud environment, according to various embodiments of the present disclosure.

FIG. 4 depicts a hybrid cloud environment, according to embodiments. The hybrid cloud environment 400 may include a hybrid cloud 430, an on-premise system 440 location and a public cloud 450 location. When operating within the hybrid cloud 430, an integration flow 432 may utilize resources from the on-premise system 440 system and the public cloud 450 so that messages may be processed on one or more nodes 434. Depending on the configuration of the integration flow 432, the one or more nodes 434 may run either on-premise system 440 or on the public cloud 450. Example integration flows 432 are described further herein in reference to FIGS. 5 and 6.

The hybrid cloud 430 may be used to connect one or more applications across the hybrid cloud for message processing. The applications may utilize the integration 432 flow, which may allow source applications 402 communicate with target applications 404. The source applications 402 may include one or more source applications in the form of source applications A-D 402A-D. The target applications 404 may include one or more target applications in the form of target applications A-D 404A-D. Source applications 402 and target applications 404 may communicate though the hybrid cloud 430 for processing messages or transferring messages processed on a first application to a second application. For example, a message may be logged by source application 402C of the source applications 402, sent over the hybrid cloud barrier to the public cloud, and enriched by target application 404A of the target applications. The message may then continue on the integration flow 432 until it has completed processing.

Figure 5:
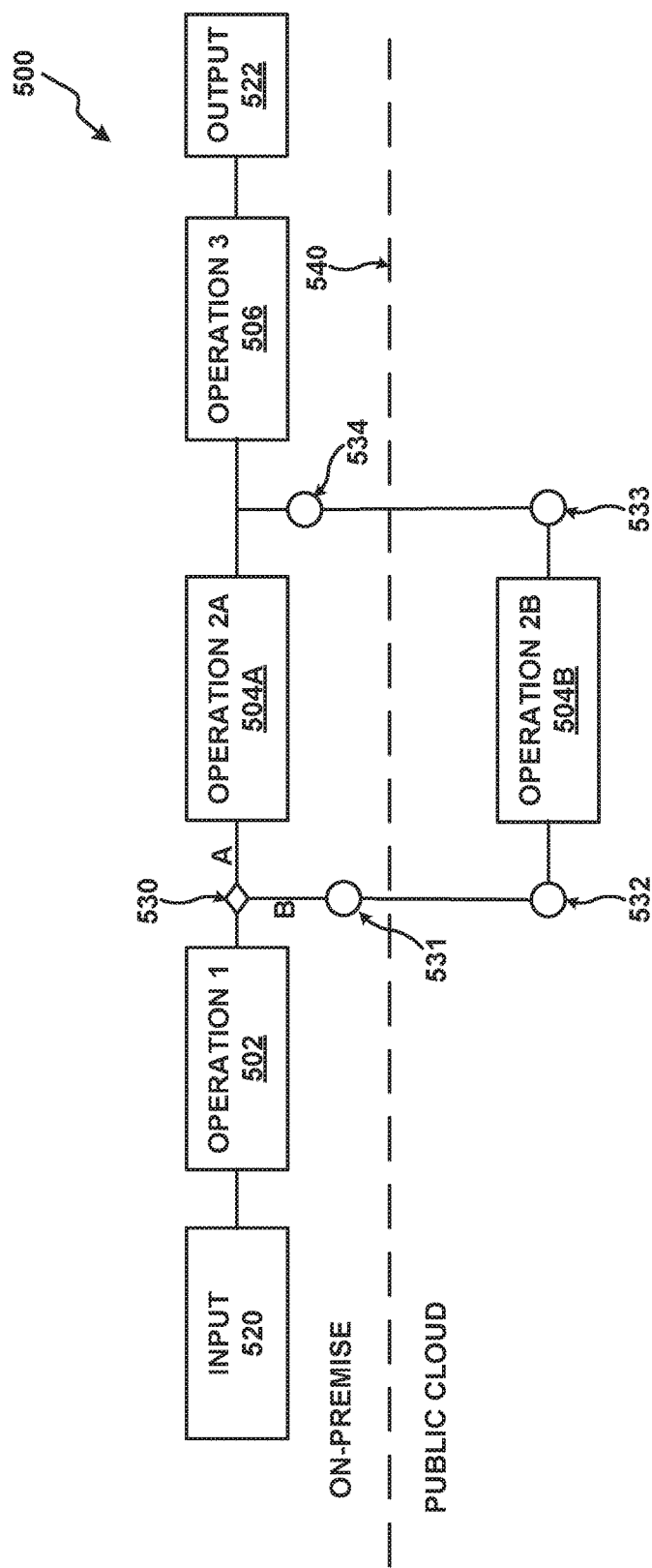
FIG. 5 depicts a service integration flow within a hybrid cloud environment, according to various embodiments of the present disclosure.

FIG. 5 depicts a service integration flow 500 within a hybrid cloud environment, according to embodiments of the present disclosure. The service integration flow 500 may operate within the hybrid cloud environment, where one or more operations (e.g., nodes) may perform operations upon messages as they pass through the integration flow. Operations may include for example, log operations, enrichment operations, transformation operations, and sub-flow operations to name a few. The operations may be performed by nodes that are on-premise system or by nodes that are on the public cloud. In some embodiments, some operations may only be performed on-premise, only on the public cloud, or performed on either on-premise system or the public cloud as optionally processed operations.

Some operators (e.g., nodes, logic) may be configured to run optionally, as an optionally processed operation, processing either on-premise system or public cloud location based on the configuration of the integration flow 500. The depiction of the integration flow 500 of the hybrid cloud deployment includes an input 520, a first operation (operation 1 502), a second optionally processed operation to be performed on-premise system as a first processing location (operation 2A 504A) or on the public cloud as a second processing location (operation 2B 504B), a third operation (operation 3 506), and an output 522. The second operation may be an optionally processed operation, which may be processed on-premise system as the second operation 504A (the first processing location), or on the public cloud as the second operation 504B (the second processing location). A route operator 530 may determine based on one or more factors to determine if the second operation will be performed on-premise system or on the cloud. The second operation 504A may be required to be performed on-premise system based on the integration flow 500, and the input 520 and output 522 may be required to be performed on-premise. The factors may include a message priority, a CPU processing load per message, a total CPU processing load, a CPU serialization load, a latency, and/or one or more other user-defined factors. The factors may be determined further herein for the first processing location, the on-premise system operation 2A 504A of the optionally processed second operation.

A route operator 530 may be hosted on the first operation 502 or on a separate node for determining if the message is to be processed on-premise system or on the public cloud. In various embodiments, one or more route operators of an integration flow may be hosted on a node on-premise. The one or more route operators may be placed within the integration flow before an optionally processed operation. For example, an integration flow may include two optionally processed operations as a second operation and a fourth operation. A first route operator may be placed before the second operation and a second route operator may be placed before the fourth operation. The first route operator and the second route operator may be hosted on a fifth node that is configured to run all of the route operators.

If the route operator determines that the message is to be processed by operation 2B 504B on the public cloud, the route operator 530 may be used to send the message to be serialized by a secure connector before being transferred over the hybrid cloud barrier 540 to the public cloud. The route operator 530 may be a node (e.g., operation), stand-alone computational process or CPU for determining if the optionally processed operation should be performed on-premise system or on the public cloud. For example, the route operator 530 may determine that the message is to be processed on the public cloud. The message may be serialized by a first secure connector 531. The first secure connector 531 may transfer the message across the hybrid cloud barrier 540 to a second secure connector 532, which deserializes the message for processing with operation 2B 504B. The message may be processed by operation 2B 504B and then sent to the third secure connector 533, which serializes the message and transfers the serialized message across the hybrid cloud barrier 540 to the fourth secure connector 534 on-premise, according to various embodiments. The fourth secure connector 534 may deserialize the message and then send the message to the third operation 506.

The route operator 530 may determine whether the second optionally processed operation may be performed on-premise system based on message priority. Messages may be assigned a message priority when being processed within the integration flow 500. The message priority may be assigned at the input 520, or after the input but before, a route operator 530 determines if the message has a first priority or a second priority. The message priority could be applied by attaching policy documents to the messages. Messages may be assigned a first priority if the message can only be processed on-premise. Messages assigned a second priority may be processed on-premise system or on the public cloud. The computer system may consider one or more factors to determine whether the message is assigned a first priority or a second priority. For example, a message with sensitive data may be assigned a first priority; the message may then only be processed on-premise system though operation 2A 504A. In an additional example, a message may be created by a user where the user tags the message as a high priority. Additional examples of high priority messages may include service level agreements (SLAs), user status, message content, and/or message status. In various embodiments, messages may be assigned a second priority or a third priority and only be processed on the public cloud.

The route operator 530 may determine whether the second optionally processed operation may be performed on-premise system based on the CPU processing load (workload) per message. If the CPU processing load per message is greater than a threshold, then the message may be processed on the public cloud. A threshold may be set on the CPU processing load and the processing of the message may be calculated for the second operation 2A 504A on-premise. The calculation may be compared to the threshold of the CPU processing load per message. The processing load for the processing/serialization of messages may be measured in CPU rate used or CPU ms/msg (CPU milliseconds per message). For example, the threshold may be set at 0.3 CPU ms/msg. If any messages are calculated to be greater than the threshold of 0.3 CPU ms/msg, then they may be sent to the public cloud for processing on the second operation 2B 504B.

The route operator 530 may determine whether the second optionally processed operation may be performed on-premise system based on the total CPU processing load. The total CPU processing load may include a total percentage of the total workload the on-premise system is taking as a whole. The CPU processing load may be a measure the total current workload of a CPU of the on-premise system environment. A threshold may be used to determine if the total CPU processing load causes the current workload of the CPU to become overloaded. If the CPU processing load is greater than or equal to the threshold, then the message may be processed on the operation 2B 504B of the public cloud. If the CPU processing load is less than the threshold, then the message may be processed on operation 2A 504A. For example, a threshold may be set on the CPU processing load at 70% of total CPU processing capacity. If the total CPU processing load is 75% then all messages that do not have a first priority may be processed on the public cloud though operation 2B 504B. If the CPU processing load is 50% then the message may be processed on-premise system though operation 2A 504A.

The CPU processing load may also be measured to determine if processing a message on-premise system will cause the CPU processing load to reach the threshold of the CPU processing load. The route operator 530 may be used to determine if the message should be sent to the on-premise system second operation 504A or the public cloud second operation 504B based on CPU processing loads of previous operations. To determine if processing the message on-premise system will cause the CPU processing load to reach the threshold, the computer system may measure the CPU processing load currently being placed on the on-premise nodes and the cost of processing the message. The route operator 530 may calculate the cost based on the previous first operation 502. For example, the second operation 504A may require 55% CPU processing load per message when compared to processing the message on the first operation 502. If the first operation 502 requires 1.02 ms/msg for a 10 kilobytes (kB) message, then the CPU processing load for processing the operation 2A on-premise system may require 0.561 CPU ms/msg for a message of 10 kB in size. If the CPU serialization load is greater than the 0.561 CPU ms/msg, then the message may be processed on the on-premise second operation 504A.

The route operator 530 may determine whether the second optionally processed operation may be performed on-premise system based on the CPU serialization load. The CPU serialization load may include the amount of CPU processing load required to serialize/deserialize the messages on-premise. If the CPU serialization load reaches or exceeds a threshold, the message may be processed on-premise system instead of processing the message on the public cloud. The CPU serialization load may be determined based on a set threshold, be compared to a CPU processing load of processing the message on-premise, or may be defined based on a user preference.

The CPU serialization load may be received by the route operator 530 and the route operator may compare the CPU serialization load to the threshold. The CPU serialization load may be dependent on the size of the message. Depending on the size of the message, the CPU serialization load may be calculated and sent to the route operator 530. For example, a CPU serialization load may require 0.1 CPU ms/msg per 10 kB message to serialize the message and 0.2 CPU ms/msg to deserialize a message of 10 kB in size totaling in 0.3 CPU ms/msg serialization/deserialization. If the message size is 20 kB, then the message may require a total CPU serialization load of 0.6 CPU ms/msg.

The CPU serialization load threshold may be determined based on a set threshold. The set CPU serialization load threshold may be determined based on an average CPU processing load of messages or just a defined CPU processing load. For example, the CPU serialization load threshold may be set at 0.5 CPU ms/msg. The route operator 530 may be calculated based on the message size resulting in the serialization/deserialization cost of the message. If the message is 10 kB, the route operator 530 may determine that the message may require 0.1 CPU ms/msg to serialize the message (e.g., serialization through the first secure connector 531), transfer the message across the hybrid cloud barrier 540 to the second operation 502B on the public cloud. The message of 10 kB may also require 0.2 CPU ms/msg to receive and deserialize the message (e.g., deserialization through the fourth secure connector 534) from the public cloud. A message size of 10 kB may be sent to the public cloud for processing on the second operation 502B. Since the combined CPU serialization load is 0.3 CPU ms/msg, which is below the 0.5 CPU ms/msg threshold, the message may be processed on the public cloud. Using the above example, a second message may be determined for processing by the route operator 530 with a size of 22 kB. The 22 kB message may require a serialization of 0.22 CPU ms/msg to serialize the message and transfer the message across the hybrid cloud barrier 540 to the second operation 502B on the public cloud, and 0.44 CPU ms/msg to receive and deserialize the message from the public cloud. Since the combined CPU serialization load is 0.66 CPU ms/msg, which is above the 0.5 CPU ms/msg threshold, the message may be processed on-premise.

The CPU serialization load threshold may depend, at least in part, on a CPU processing load determined by the route operator 530. The CPU serialization load may be compared to the CPU processing load to determine if the CPU serialization load is greater than the CPU processing load. In embodiments, a CPU processing load of a message may be determined though the route operator 530 and used as the threshold for the CPU serialization load. For example, if the CPU processing load for processing a first message on-premise system is 0.54 CPU ms, and the CPU serialization load for the first message is 0.6 CPU ms, the first message may be processed on-premise. In an additional example, if the CPU processing load for processing a second message on-premise system is 0.5 CPU ms, and the CPU serialization load is 0.4 CPU ms, the message may be processed on the public cloud.

The route operator 530 may determine whether the second optionally processed operation may be performed on-premise system based on the latency of the message. The latency of the message may be predicted by the route operator 530 and may include the amount of time the message will take to be processed though the second operation 2B 504B on the public cloud. For the message to be processed on the public cloud, the message may require to be serialized on-premise, sent to the second operation 2B 504B, deserialized, processed by the second operation 2B 504B, serialized on the public cloud, sent back to the on-premise system third operation 506, and deserialized on-premise. A threshold of the latency may be set at a desired latency; if the predicted latency is greater than the threshold of the latency, then the message will be processed on-premise. For example, the threshold of the latency may be set at 3 milliseconds (ms). If the message has a predicted latency of less than 3 ms processing time, then the message may be processed on the public cloud.

In various embodiments, the factors of the integration flow 500 may be organized and determined in a combination based on a user selected configurations of the factors. The factors are further described herein in no particular order and may be used singularly or in combination based on a user-selected configuration. An example of a combination may include determining the CPU processing load and latency based on a combination of one or more thresholds. For example, a threshold may be set on the latency of 2 ms per message and the CPU processing load may be set at 75%. If the message is determined to have a 3 ms predicted latency, when processed on the public cloud but the on-premise system processing load is determined at 70%, then the message may be processed on-premise. If the message is determined to have a 2 ms predicted latency and the on-premise system CPU processing load is 76%, then the message may be processed on the public cloud. In the event that both the predicted latency and the CPU processing load have reached their thresholds, a secondary determination may be made based on factor hierarchy or the combination that is closer to their threshold. For example, the predicted latency of a message may be of 3 ms, and a CPU processing load may be 80%. In the example, the predicted latency of the message is 50% greater than the threshold, but the processing load is only 14% greater than its threshold. Using the closer to the threshold determination, the message may be processed on-premise.

In various embodiments, the factors of the integration flow 500 may be organized and determined either though a hierarchy. Hierarchy determination may be made based on the factors being ranked from most important to least important based on the configuration determined by the user. For example, the hierarchy may be organized such that the most important determination is the message priority, followed by the total CPU processing load, the CPU processing load per message, the CPU serialization load, and finally the latency. Based on this hierarchy structure, the message priority is the most important factor; if the message does not have a first priority, then the CPU processing load may be determined, and so on and so forth. In an example using the previously mentioned hierarchy, thresholds may be set at a total CPU processing threshold of 75%, a CPU processing load of 0.3 CPU ms/msg, a CPU serialization load of 0.3 CPU ms/msg, and a 3 ms latency. If a message has a second priority, a CPU processing load of 74%, a CPU processing load of 0.25 CPU ms/msg, a CPU serialization load of 0.2 CPU ms/msg, and a predicted latency of 2 ms, then the message may be processed on-premise system though operation 2A 504A even though it has a second priority. In an additional example, a second message may have a second priority, a CPU processing load of 78%, a CPU processing load of 0.25 CPU ms/msg, a CPU serialization load of 0.3 CPU ms/msg, and a predicted latency of 2 ms. The second message may be processed on the public cloud through operation 2B 504B because even though the CPU serialization load would cause the message to be processed-on-premise, the CPU processing load being greater than the threshold by 3% causes the message to be processed on the public cloud operation 502B due to hierarchy of the factors. If a message has a first priority, then it may automatically be processed on-premise system though operation 2A 504A and the computer system may not take into account the rest of the factors.

In various embodiments, a determination of whether the optionally processed second operation is to be performed on-premise system (operation 2A 504A) or on the public cloud (operation 2B 504B) may include factoring in system characteristics. An appropriate factor from an appropriate benchmark database may be applied if the on-premise system and public cloud systems are not similar. In an example, the on-premise system hardware may process messages twice as fast as the public cloud system. If a CPU processing load per message cost calculated for the public cloud then the calculation of the on-premise system cost may be half.

In various embodiments, a dynamic determination of the processing of a message may be based on monitoring metrics. The monitoring metrics may be stored or attached to the nodes in such a way that the monitoring metrics may be queried based on particular message property. For example, a 10 kB message may be dynamically determined to be processed on-premise system or on the public cloud by retrieving monitoring metrics from the database associated with previously processed 10 kB messages. If the monitoring metrics results in a determination that messages of 10 kB in size are processed on-premise, then the message may be processed on-premise. In an additional example, other message properties may be searchable such as schema or particular XPaths, etc.

Figure 6:
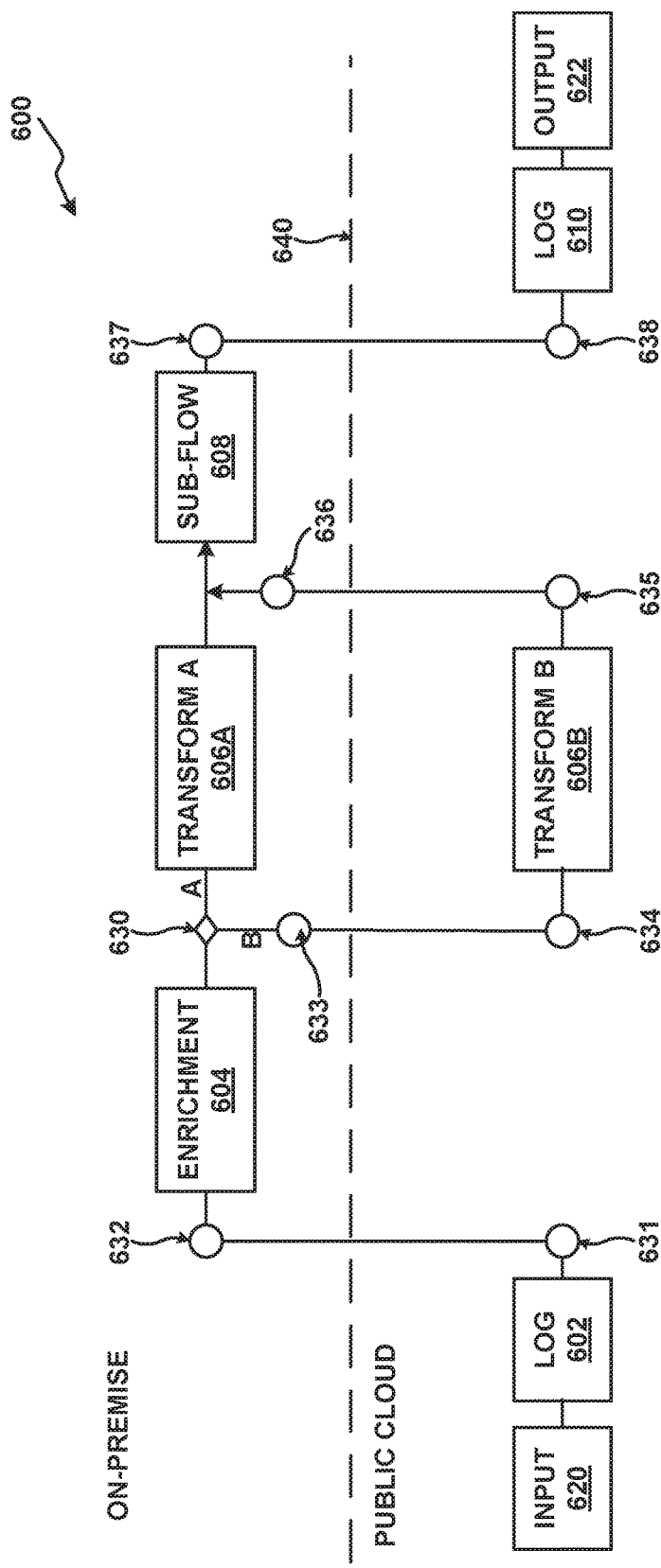
FIG. 6 depicts an example of a service integration flow within a hybrid cloud environment, according to various embodiments of the present disclosure.

FIG. 6 depicts an example of a service integration flow 600 within a hybrid cloud environment, according to embodiments. The service integration flow 600 may include one or more nodes, which perform an operation on messages being processed within the integration flow 600. The example integration flow 600 may be processed on a hybrid cloud environment. The example integration flow 600 includes a single, optionally processed transformation operation. The optionally processed transformation operation may be processed at a first processing location (transform A 606A) on-premise, or at a second processing location (transform B 606B) on the public cloud.

The integration flow 600 may proceed as follows. An input 620 may receive or access the messages to be processed on the public cloud. The input 620 may send the received messages to the first log 602 operation (node). The log 602 operation may transfer the logged messages to an enrichment 604 operation on-premise. Before the message may be sent to the enrichment operation 604, the message may be serialized by a first secure connector 631; the serialized message may be transferred across the hybrid cloud barrier 640 from the public cloud to a second secure connector 632 on-premise. The second secure connector may deserialize the message and send the message to the enrichment 604 operation. The enrichment 604 operation may then process the message. After processing the message, the message may proceed to a route operator 630. The route operator 630 may determine a processing path of the message.

The route operator 630 may determine if the message is processed on-premise system with a transform A 606A, or on the public cloud with a transform B 606B. The route operator 630 may use one or more factors, described in reference to FIG. 5, to determine where the message will be processed. For example, a factor may include a threshold of the total CPU processing load. If the total CPU processing load has reached the threshold, then the message may be sent from the route operator 630 to the transform B 606, on the public cloud. If the total CPU processing load is less the threshold, then the message may be sent from the route operator 630 to the transform A 606A. If the message is sent from the route operator 630 to transform A 606A, the message may be processed without secure connectors and sent to the sub-flow 608 operation. If the message is to be sent to the transform B 606B, the route operator 630 may send the message to a third secure connector 633. The third secure connector 633 may serialize the message and transfer the message across the hybrid cloud barrier 640 to a fourth secure connector 634, which is on the public cloud. The fourth secure connector 634 may deserialize the message for processing by the transform B 606B operation on the public cloud. The deserialized message may then be processed by the transform B 606B operation, and after processing, the message may be sent to a fifth secure connector 635. The fifth secure connector 635 may serialize the message and transfer the message across the hybrid cloud barrier 640 to a sixth secure connector 636, which is on-premise. The sixth secure connector 636 may deserialize the message for processing by the sub-flow 608 operation, on-premise.

The message either non-serialized, from transform A 606A, or deserialized, from transform B 606B operation, may be sent to a sub-flow 608 operation. The sub-flow 608 operation may then process the message and send the message to a seventh secure connector 637 to be serialized and transferred across the hybrid cloud barrier to an eighth secure connector 638, on the public cloud. The eighth secure connector 638 may receive and deserialize the serialized message from the seventh secure connector 637, and the eighth secure connector may send the message to a second log 610 operation. The second log 610 operation may process the message and then send the message to the output 622.

In the preceding example, the enrichment operation and the sub-flow operation may be processed on-premise, possibly due to data restrictions, with an optionally preformed transform operation in-between, which may not be marked as restricted. For example, a non-restricted operation may be executed in the public cloud environment. However, the optionally performed transform operation may also be deployed to the on-premise system environment as well. For example, the processing of a message can be determined to be processed on-premise, transform A operation, or on the public cloud, transform B operation, based on a CPU processing load (cost per message). In the example, the on-premise system cost of transferring the message, including serialization, to the public cloud and receiving, including deserialization, the message back again in the secure connectors may be 0.2+0.1=0.3 CPU ms/msg. The 0.3 CPU ms/msg cost of the CPU processing load of the on-premise system environment for serialization/deserialization per each message may be set as a threshold for the CPU processing load per message determination. In the example, if the transform A operation, on-premise, costs 0.1 CPU ms/msg based on runtime monitoring, then the message may require less of a CPU processing load per message to be processed on-premise, through transform A 606A. Thus, if the transform operation was performed on-premise, the cost of the connector would be saved and the processing cost on-premise system would be reduced from 0.3 CPU ms/msg (transferring to the public cloud) to 0.1 CPU ms/msg (performing the transform A 606A on-premise). In the example, the route operator may determine that processing the transform operation on-premise system would be a more efficient solution than transferring across the hybrid cloud barrier 640 the message for processing on the public cloud, so the runtime logic would be altered accordingly, based on the monitoring and analysis.

In an additional example, the on-premise system portion of the CPU processing load may not be reduced, or may even increase slightly, when moving a processing operation on-premise; however, it may have other advantages such as reduced latency (elapsed time). A determination could be made to bring operations on-premise system even if it increased the CPU cost if the latency was reduced to benefit SLAs. If the system monitoring showed that there were free resources on the "on-premise" system, then the transform operation may be moved on-premise.

Figure 7:
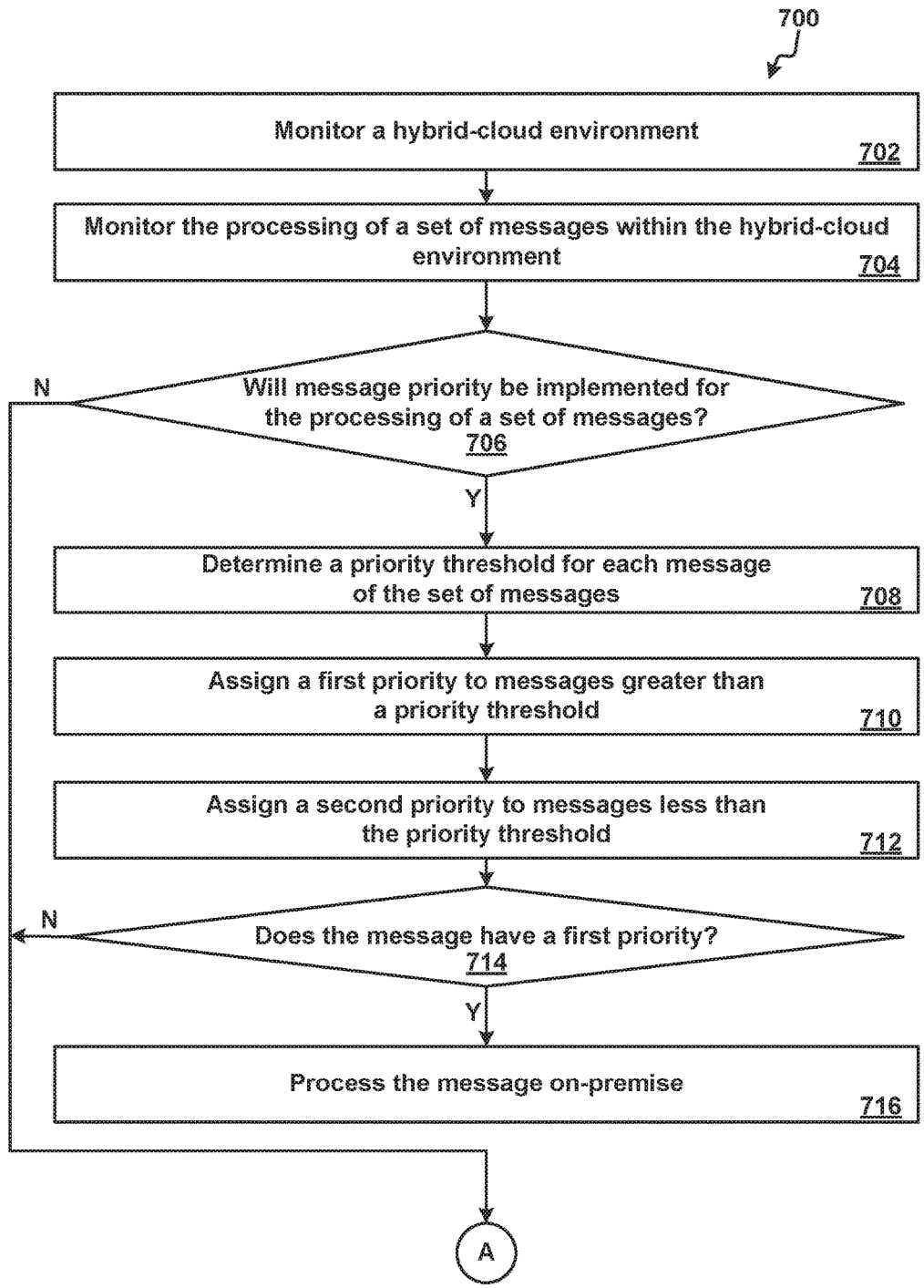
FIG. 7 depicts a flowchart for determining a location for a processing of a message based on the priority of the message, according to various embodiments of the present disclosure.

FIG. 7 depicts a flowchart for determining the processing of a message based on the priority of the message, according to embodiments. The flowchart illustrates a method 700 for determining if a message may be processed on-premise system based on the priority of the message. If the message has a first priority, then the message may be processed on-premise. If the message does not have a first priority, then the message may be optionally processed on-premise system or on the public cloud, based on one or more other factors of the hybrid cloud environment.

In operation 702, a hybrid cloud environment is monitored. The hybrid cloud environment may include an on-premise system environment including one or more applications performing one or more operations on an integration flow, and a public cloud environment including one or more applications performing one or more operations on the integration flow. The integration flow of the hybrid cloud may merge the on-premise system environment and the public cloud to perform one or more operations on messages as they are processed in the integration flow.

In operation 704, a processing of a set of messages within the integration flow of the hybrid cloud environment is monitored. The monitoring of the messages may include determining the message size, message contents, and/or other user-defined parameters of messages.

In decision block 706, a determination is made if message priority will be applied to the set of messages. The determination of message priority may be implemented by a user or automatically applied if a message contains a first priority attribute. For example, an on-premise system environment may have a SLA with a first company. The SLA may require all messages received from the first company to be processed on-premise system as a first priority attribute, and if a message enters the integration flow from the first company, then the message may be assigned a first priority. Inputting (receiving) a message with a first priority may instruct the integration flow to include a message priority determination on the set of messages. If message priority will not be applied to the set of messages, then the method 700 may progress to A where the flowchart combines with method 800 of FIG. 8 for processing messages without a first priority. If message priority will be applied to the set of messages, then the method 700 may progress to operation 708.

In operation 708, a priority threshold may be determined for each message of the set of messages. The threshold may be used determine if a message of the set of messages is to be processed on-premise system based on the priority of the message. The threshold may be user-defined and/or may encompass a multitude of possible user defined configurations. In an example, a priority may be defined for the set of messages such that messages may receive a first priority if they include sensitive data (e.g., a document or clause) within the message. In an example, the threshold may be set such that every message containing the first priority contains sensitive data and may be processed on-premise.

In various embodiments, each set of one or more sets of messages may result in a different priority threshold. For example, a first priority threshold may be set on a first set of messages to assign a first priority only to messages with a size of less than 5 kB, whereas a second priority threshold of a second set of messages may be set on the second set of messages to assign a first priority to messages with a size of less than 7 kB.

In operation 710, a first priority may be assigned to messages that have reached or exceeded the priority threshold. For example, the first priority may be assigned to messages containing sensitive data, below a certain file size, or based on SLAs. In operation 712, a second priority may be assigned to messages less than the priority threshold. For example, the messages containing the second priority may include messages without sensitive data, above a certain file size, or unassigned messages.

In decision block 714, a determination is made if the message of the set of message has a first priority. The priority of the first message may be compared to the first priority, and if the message has a first priority, then the message may be processed on-premise. For example, a route operator may determine if a message has a first priority. The route operator may then send the message to the on-premise system operation (first priority) or further determine if the message is to be processed on-premise system (second priority). If the message has a first priority, then the method 700 may progress to operation 716. If the message does not have a first priority, then the method 700 may progress to A where the flowchart continues into method 800 of FIG. 8 for processing messages without a first priority.

In operation 716, messages with a first priority are processed on-premise. In the example, the route operator may transfer messages with the first priority to the on-premise system operation. The operation may then process the message and the message may continue through the integration flow.

In various embodiments, the message may maintain its first priority throughout the integration flow, in other embodiments, the priority of the message may be altered as the message passes through sections of the integration flow. Depending on the configuration, a message may keep its first priority. For example, if the message contains secure information, then the message may maintain the first priority. In an additional example, a message that receives a first priority based on its message size may lose its first priority if the message size priority was only assigned for a specific operation.

Figure 8:
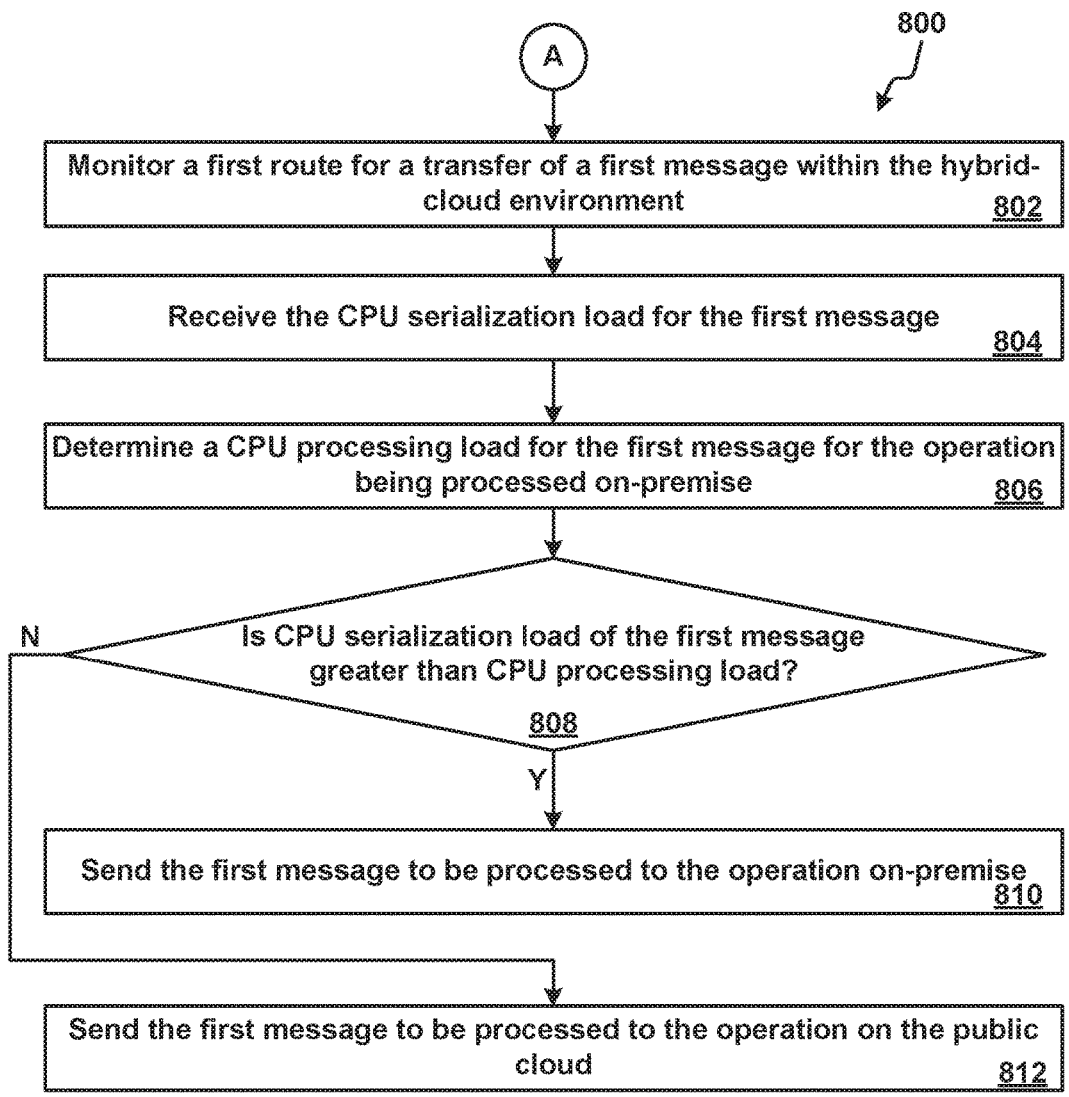
FIG. 8 depicts a flowchart for determining a location of a processing of a message based on a CPU workload, according to various embodiments of the present disclosure.

FIG. 8 depicts a flowchart for determining the processing of a message based on a CPU workload, according to embodiments. A method 800 is illustrated to determine if a CPU processing load for a first message is less than a CPU serialization load of the first message to determine if the message may be processed on-premise system or on a public cloud of a hybrid cloud environment. If the CPU processing load for the first message is less than the CPU serialization load, then the message may consume less of the CPU processing load if processed in the on-premise system environment. Accordingly, if the CPU processing load is less than the CPU serialization load, then the message may be processed on-premise.

In operation 802, a first route operator of one or more route operators for the transfer of messages is monitored within the integration flow of the hybrid cloud environment. The first route operator may perform a function for determining if a first message is to be processed through an operation on-premise, or sent to the public cloud for processing. One or more route operators may be monitored and utilized for determining the transfers of messages over the hybrid cloud barrier. For example, a first route operator may be monitored within the integration flow. The first route operator may determine if a first message of a set of messages will be processed on-premise system or on the public cloud.

In operation 804, a CPU serialization load for a first message within a set of messages. The CPU serialization load may be determined based on the first route operator. The CPU serialization load may include the amount of CPU processing load required for the first message to be serialized, sent to the public cloud, received from the public cloud, and deserialized. For example, a CPU serialization load of the first message may be received by the first route operator. The first message may require a 0.1 CPU ms/msg for a serialization operation (CPU serialization load), and 0.2 CPU ms/msg for a deserialization operation totaling 0.3 CPU ms/msg per serialization/deserialization operation of the first message.

In various embodiments, a threshold may be set on the serialization/deserialization operations. If the first message was to exceed the threshold, then the first message may be automatically sent to the on-premise system operation. For example, a threshold may be set at 0.5 CPU ms/msg per serialization/deserialization operation. If the first message has a CPU serialization load of 0.6 CPU ms/msg per serialization/deserialization operation, then the first message may automatically be processed on-premise.

In operation 806, the first route operator may calculate a CPU processing load for processing the first message on-premise. The CPU processing load may include the amount of CPU processing load required for the first message to be processed by the optionally processed operation on-premise. The first message may be calculated by the route operator. For example, the route operator may calculate that the first message has a 0.25 CPU ms/msg.

In some embodiments, the CPU processing load may be calculated by comparing the first message to previously processed messages on the on-premise system operation. Calculating the CPU processing load may include receiving the size of the message to be processed, the processing load required to process a previous message on the operation, and the size of the previous message processed by the operation. For example, a previous message may be 10 kB in size and may have taken 0.2 CPU ms/msg to be processed by the operation. If the first message to be processed is 15 kB in size, the first message may require 0.3 CPU ms/msg to process on the on-premise system operation.

In some embodiments, the CPU processing load may be calculated by comparing a processing time of the first message in a previous operation prior to the optionally processed operation. The first message may have been processed by a previous operation before the route operator. If the first message has been processed by a previous operation, then the CPU processing load may be calculated by comparing the previous operation to the optionally processed operation using the CPU processing load for the first message processed on the previous operation. For example, the CPU processing load of the first message in a first operation may be 1.0 CPU ms/msg. If the optionally processed second operation requires 25% of the CPU processing load of the first operation to be processed on-premise, then the first message may require 0.25 CPU ms/msg to be processed on the on-premise system operation.

In various embodiments, a threshold may be set on the CPU processing load. If the first message was to exceed the CPU processing load threshold, then the first message may automatically be sent to the operation on the public cloud. For example, a threshold may be set at 0.4 CPU ms/msg per operation. If the first message has a CPU processing load of 0.5 CPU ms/msg, then the first message may be processed on the public cloud.

In decision block 808, a determination is made for the first message if the CPU serialization load is greater than the CPU processing load. A route operator may determine (e.g. compare) if the received CPU serialization load is greater than the calculated CPU processing load. If the CPU serialization load is greater than or equal to the CPU processing load, then the method 800 may progress to operation 810 where the first message will be processed on the on-premise system operation. For example, the first message may have a CPU serialization load of 0.25 CPU ms/msg and a CPU processing load of 0.15 CPU ms/msg. Since the CPU serialization load is 0.1 CPU ms/msg is greater than the CPU processing load, the first message may be processed on-premise. If the CPU serialization load is less than the CPU processing load, then the method 800 may progress to operation 812 where the first message will be processed on the public cloud operation. For example, the first message may have a CPU serialization load of 0.2 CPU ms/msg and a CPU processing load of 0.32 CPU ms/msg. Since the CPU serialization load is 0.12 CPU ms/msg less than the CPU processing load, the first message may be processed on the public cloud.

In operation 810, the first message is sent to the operation on-premise system for processing. If the first message was determined to have a lower or equal CPU processing load than the CPU serialization load, then the first message may proceed to the on-premise system operation for processing. After processing, the first message may continue to the next operation or route operator on-premise.

In operation 812, the first message is sent to the operation on the public cloud for processing. If the first message was determined to have a greater CPU processing load than the CPU serialization load, then the first message may proceed to the public cloud operation for processing. The first message may be sent from the route operator to a secure connector, serialized, and sent across the hybrid cloud barrier to the operation on the public cloud. The first message may be received by a secure connector on the public cloud where the first message may be deserialized and sent to the optionally processing operation. After the optionally processing operation completes the processing of the first message, then the first message may proceeded to a second operation on the public cloud or to a secure connector to be serialized and sent across the hybrid cloud barrier to an on-premise systems secure connector.

The present disclosure may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for efficiently determining computer resource allocation, the method comprising:
   monitoring an integration flow, the integration flow including a route, one or more nodes, and one or more secure connectors, wherein the one or more nodes and the one or more secure connectors are computing resources in a shared pool of configurable computing resources;
   receiving a first message;
   receiving a central processing unit (CPU) serialization load, the CPU serialization load comprising a set of processing data, the set of processing data reflecting the amount of a CPU processing load required to serialize and deserialize the first message on-premise;
   receiving a first threshold of the CPU processing load of the first message, wherein the first threshold is a ratio of serialization load to CPU processing load of the first message;
   determining that the set of processing data is below the first threshold, comprising:
       determining the serialization load of the first message;
       determining the CPU processing load of the first message;
       determining the ratio of serialization load to CPU processing load; and
       comparing the ratio of serialization load to CPU processing load to the first threshold;
   identifying, based on the determining, a processing location of the integration flow at a second node of the one or more nodes, wherein the second node is hosted on a public cloud; and
   transmitting, for processing, the first message to the second node.

2. The method of claim 1, wherein the transmitting further comprises:
   serializing the first message at a first secure connector, wherein the first secure connector is located on-premise;
   transferring the first message to a second operation of the second node;
   deserializing the first message at a second secure connector; and
   processing the message.

3. The method of claim 1, wherein the integration flow is hosted on a hybrid cloud environment, and the first node is hosted on an on-premise system.

4. The method of claim 3, wherein software is provided as a service within the hybrid cloud environment for communicating between source and target applications.

5. The method of claim 1, further comprising:
   receiving a second threshold of the processing load of the first message, wherein the second threshold is selected from one of the group consisting of: a CPU processing load of the first message, a predicted total processing load, a CPU serialization load of the first message, a ratio of serialization load to CPU processing load of the first message, a total CPU processing load, and a latency of the first message, and wherein the second threshold is different from the first threshold;

determining that the set of processing data has reached the second threshold; and altering, based on the second threshold being reached, the processing location of the integration flow such that the first message is processed on a third node of the one or more nodes.

6. The method of claim 1, further comprising:

receiving a message property of the first message;

querying a database of historical data for a plurality of previous messages having the same message property;

determining that the plurality of previous messages was processed on a third node of the one or more nodes; and altering, based on the message property, the processing location of the integration flow such that the first message is processed on the third node.

7. A system comprising:

a memory;

a processor device communicatively coupled to the memory; and a hybrid cloud environment communicatively coupled to the processor device and the memory wherein the hybrid could environment is configured to:

monitor an integration flow, the integration flow including a route, one or more nodes, and one or more secure connectors, wherein the one or more nodes and the one or more secure connectors are computing resources in a shared pool of configurable computing resources;

receive a first message;

receive a central processing unit (CPU) serialization load, the CPU serialization load comprising a set of processing data, the set of processing data reflecting the amount of a CPU processing load required to serialize and deserialize the first message on-premise;

receive a first threshold of the CPU processing load of the first message, wherein the processing load is a ratio of serialization load to CPU processing load of the first message;

determine that the set of processing data is below the first threshold, comprising:

determine the serialization load of the first message;

determine the CPU processing load of the first message;

determine the ratio of serialization load to CPU processing load; and compare the ratio of serialization load to CPU processing load to the first threshold;

alter, based on the determining, a processing location of the integration flow at a second node of the one or more nodes, wherein the second node is hosted on a public cloud; and transmitting, for processing, the first message to the second node.

8. The system of claim 7, wherein the hybrid cloud is further configured to:

serialize the first message at a first secure connector, wherein the first secure connector is located on-premise;

transfer the first message to a second operation of the second node;

deserialize the first message at the second secure connector; and process the message.

9. The system of claim 7, wherein the integration flow is hosted on the hybrid cloud environment where the first node is hosted on an on-premise.

10. The system of claim 9, wherein software is provided as a service within the hybrid cloud environment for communicating between source and target applications.

11. The system of claim 7, wherein the hybrid cloud is further configured to:

receive a second threshold of the processing load of the first message, wherein the second threshold is selected from one of the group consisting of: a CPU processing load of the first message, a predicted total processing load, a CPU serialization load of the first message, a ratio of serialization load to CPU processing load of the first message, a total CPU processing load, and a latency of the first message, and wherein the second threshold is different from the first threshold;

determine that the set of processing data has reached the second threshold; and alter, based on the second threshold being reached, the processing location of the integration flow such that the first message is processed on a third node of the one or more nodes.

12. The system of claim 7, wherein the hybrid cloud is further configured to:

receive a message property of the first message;

query a database of historical data for a plurality of previous messages having the same message property;

determine that the plurality of previous messages was processed on a third node of the one or more nodes; and alter, based on the message property, the processing location of the integration flow such that the first message is processed on the third node.

13. A computer program product for determining processing location of a message comprising a computer readable storage medium having a computer readable application stored therein, wherein the computer readable application, when executed on a computing device, causes the computing device to:

monitor an integration flow, the integration flow including a route, one or more nodes, and one or more secure connectors, wherein the one or more nodes and the one or more secure connectors are computing resources in a shared pool of configurable computing resources;

receive a first message;

receive a central processing unit (CPU) serialization load, the CPU serialization load comprising a set of processing data, the set of processing data reflecting the amount of a CPU processing load required to serialize and deserialize the first message on-premise;

receive a first threshold of the CPU processing load of the first message, wherein the processing load is a ratio of serialization load to CPU processing load of the first message;

determine that the set of processing data is below the first threshold, comprising:

determine the serialization load of the first message;

determine the CPU processing load of the first message;

determine the ratio of serialization load to CPU processing load; and compare the ratio of serialization load to CPU processing load to the first threshold;

alter, based on the determining, a processing location of the integration flow at a second node of the one or more nodes, wherein the second node is hosted on a public cloud; and transmitting, for processing, the first message to the second node.

14. The computer program product of claim 13, wherein the computing device is further configured to:

serialize the first message at a first secure connector, wherein the first secure connector is located on-premise;

transfer the first message to a second operation of the second node;

deserialize the first message at the second secure connector; and process the message.

15. The computer program product of claim 13, wherein the computing device is further configured to:

receive a second threshold of the processing load of the first message, wherein the second threshold is selected from one of the group consisting of: a CPU processing load of the first message, a predicted total processing load, a CPU serialization load of the first message, a ratio of serialization load to CPU processing load of the first message, a total CPU processing load, and a latency of the first message, and wherein the second threshold is different from the first threshold;

determine that the set of processing data has reached the second threshold; and alter, based on the second threshold being reached, the processing location of the integration flow such that the first message is processed on a third node of the one or more nodes.

16. The computer program product of claim 13, wherein the computing device is further configured to:

receive a message property of the first message;

query a database of historical data for a plurality of previous messages having the same message property;

determine that the plurality of previous messages was processed on a third node of the one or more nodes; and alter, based on the message property, the processing location of the integration flow such that the first message is processed on the third node.

* * * * *